United States Patent
Cho et al.

(10) Patent No.: US 10,343,334 B2
(45) Date of Patent: Jul. 9, 2019

(54) OBJECT-FORMING MACHINE, CROSS-SECTION MEASUREMENT APPARATUS, AND CROSS-SECTION MEASUREMENT METHOD

(71) Applicant: MITUTOYO CORPORATION, Kawasaki-shi, Kanagawa (JP)

(72) Inventors: Gyokubu Cho, Kawasaki (JP); Hidemitsu Asano, Kawasaki (JP); Masato Kon, Kawasaki (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 232 days.

(21) Appl. No.: 15/188,339

(22) Filed: Jun. 21, 2016

(65) Prior Publication Data

US 2016/0375640 A1    Dec. 29, 2016

(30) Foreign Application Priority Data

Jun. 29, 2015   (JP) ................................ 2015-130229

(51) Int. Cl.
   *B29C 67/00*      (2017.01)
   *B29C 64/386*     (2017.01)
   *B29C 64/106*     (2017.01)
   *B33Y 30/00*      (2015.01)
   *B33Y 50/02*      (2015.01)
   (Continued)

(52) U.S. Cl.
   CPC .......... *B29C 64/386* (2017.08); *B29C 64/106* (2017.08); *B29C 64/20* (2017.08); *B29C 64/393* (2017.08); *B33Y 30/00* (2014.12); *B33Y 50/02* (2014.12); *G05B 19/41875* (2013.01); *G06T 7/0004* (2013.01); *G06T 7/13* (2017.01); *G06T 7/62* (2017.01)

(58) Field of Classification Search
   CPC ..... B29C 64/393; B29C 64/386; B29C 64/20; B29C 64/106; B29C 67/0055; B29C 67/0088; G05B 19/41875; B06T 7/0004; B06T 7/13; B06T 7/62; G06T 7/0004; G06T 7/13; G06T 7/62
   USPC ..... 425/136, 140, 141, 375, 174.4; 264/308, 264/40.1
   See application file for complete search history.

(56) References Cited

U.S. PATENT DOCUMENTS

| | | | |
|---|---|---|---|
| 2014/0036035 A1* | 2/2014 | Buser | B33Y 10/00 348/46 |
| 2015/0165683 A1* | 6/2015 | Cheverton | G06T 7/0004 382/141 |
| 2015/0336331 A1 | 11/2015 | Potter | |

FOREIGN PATENT DOCUMENTS

| | | |
|---|---|---|
| JP | 106-503764 A | 4/1994 |
| JP | H09-147146 A | 6/1997 |

(Continued)

OTHER PUBLICATIONS

Mar. 26, 2019 Office Action issued in Japanese Patent Application No. 2015-130229.

*Primary Examiner* — Joseph S Del Sole
*Assistant Examiner* — Lawrence D. Hohenbrink, Jr.
(74) *Attorney, Agent, or Firm* — Oliff PLC (57) ABSTRACT

A 3D printer includes: an object-forming unit for forming an object by laminating an object material at an object-forming point based on a design data; an image capturing unit for capturing an image of the object formed by the object-forming unit; and a shape measurement unit for measuring a cross section of the object based on the image captured by the image capturing unit while the object is under formation by the object-forming unit.

7 Claims, 5 Drawing Sheets

(51) Int. Cl.
　　　*G06T 7/13*　　　　(2017.01)
　　　*B29C 64/393*　　(2017.01)
　　　*G06T 7/62*　　　　(2017.01)
　　　*B29C 64/20*　　　(2017.01)
　　　*G06T 7/00*　　　　(2017.01)
　　　*G05B 19/418*　　(2006.01)

(56) References Cited

FOREIGN PATENT DOCUMENTS

| | | | |
|---|---|---|---|
| JP | 2000-127251 | A | 5/2000 |
| JP | 2001-264047 | A | 9/2001 |
| JP | 2008-307895 | A | 12/2008 |
| JP | 2014-502931 | A | 2/2014 |
| JP | 2016-118531 | A | 6/2016 |
| WO | 2016/042810 | A1 | 3/2016 |
| WO | 2016/143137 | A1 | 9/2016 |

\* cited by examiner

OBJECT-FORMING MACHINE, CROSS-SECTION MEASUREMENT APPARATUS, AND CROSS-SECTION MEASUREMENT METHOD

The entire disclosure of Japanese Patent Application No. 2015-130229 filed Jun. 29, 2015 is expressly incorporated by reference herein.

TECHNICAL FIELD

The present invention relates to an object-forming machine, a cross-section measurement apparatus and a cross-section measurement method capable of measuring a cross section of a three-dimensional object.

BACKGROUND ART

Object-forming machines (so-called 3D printers) configured to form a three-dimensional object have been known. The 3D printers are usually configured to laminate layers of an object material one by one in accordance with a design data to produce an object of a desired cross section.

When a certain degree of accuracy is required for an outer profile or an inner structure of the object formed using such a 3D printer, a dedicated apparatus has been used to measure an inner cross section of the formed object (see, for instance, Patent Literature 1: JP-A-2001-264047, Patent Literature 2: JP-A-09-147146).

The apparatus disclosed in Patent Literature 1 captures an image of a cross section of a three-dimensional object using an X-ray CT scanner and calculates a difference between the captured image and the design data. The apparatus disclosed in Patent Literature 2 uses an MRI to inspect a cross section of the formed three-dimensional object.

However, the cross-section inspection using the X-ray CT scanner or MRI disclosed in the above Patent Literatures 1 and 2 requires an expensive and large-sized apparatus. Further, when X-ray and the like are used, such an inspection entails a problem in terms of safety.

SUMMARY OF THE INVENTION

An object of the invention is to provide an object-forming machine, a cross-section measurement apparatus and a cross-section measurement method capable of easily measuring a cross section of a formed object.

An object-forming machine according to an aspect of the invention includes: an object-forming unit configured to laminate an object material at an object-forming point based on a design data to form an object; an image-capturing unit configured to capture an image of the object formed by the object-forming unit; and a cross-section measurement unit configured to measure a cross section of the object based on the image captured by the image-capturing unit while the object is under formation by the object-forming unit.

In the above aspect of the invention, the image-capturing unit captures an image of a three-dimensional object under formation while the object-forming unit is forming a three-dimensional object. The cross-section measurement unit measures the cross section of the object based on the image captured by the image-capturing unit while the object is under formation.

The object-forming unit of the above aspect of the invention forms the object by laminating a layer of the object material one by one at the object-forming point corresponding to a profile of the cross section of the object when the object is to be formed. Accordingly, the cross section of the entirety of the object can be measured by combining a plurality of the images of the object under formation (e.g. captured images per one layer) and the shape of each of the layers can be determined based on the captured images of the layers.

The above-described large-sized dedicated device is required in order to measure the inner cross section after the object has been formed. However, in the above aspect of the invention, since it is only necessary to capture the images of the object under formation, a small-sized image-capturing unit such as CMOS (Complementary Metal Oxide Semiconductor) and CCD (Charge Coupled Device) can be used. Thus, without the need for the dedicated large-sized device such as an X-ray CT scanner and MRI, an object-forming machine capable of measuring the inner cross section of an object with a simple structure can be provided. Further, since no X-ray or the like is used, the above aspect of the invention offers an advantage in terms of safety.

The object-forming machine according to the above aspect of the invention preferably includes a shape determination unit configured to determine whether or not a measurement data of the object measured by the cross-section measurement unit is within a dimensional tolerance defined based on the design data.

In the above arrangement, the shape determination unit determines whether the measurement result (measurement data) measured by the cross-section measurement unit has an accuracy within a range of the dimensional tolerance. Accordingly, whether or not the object is a highly accurate object in conformity with the design data can be easily determined.

Further, since the cross sectional profile of the object under formation can be captured in the above arrangement, whether or not the accuracy of the object under formation is in conformity with the design data can be determined even while the object is under formation.

The object-forming machine according to the above aspect of the invention preferably includes an object-formation abort unit configured to abort an object-forming process by the object-forming unit when the shape determination unit determines that the measurement data is outside the dimensional tolerance.

In the above arrangement, when the shape determination unit determines that the measurement data of the object under formation exceeds the dimensional tolerance, the object-formation abort unit aborts the object-forming process performed by the object-forming unit. In other words, the formation of the object is immediately aborted when the formation accuracy of the object is insufficient. According to the above arrangement, the waste of the object material and accompanying increase in production cost can be restrained as compared with an instance where the object is kept under formation even though the profile of the formed object includes some error.

The object-forming machine according to the above aspect of the invention preferably includes a shape-correction control unit configured to control the object-forming unit to correct a shape of the object at the object-forming point when the shape determination unit determines that the measurement data is outside the dimensional tolerance.

In the above arrangement, when the shape determination unit determines that the measurement data of the object under formation exceeds the dimensional tolerance, the shape-correction control unit controls the object-forming unit to correct the shape of the object. Specifically, the shape-correction control unit supplies an additional amount of the object material to a portion with a low formation accuracy or removes a part of the laminated object based on the measurement data. With the above arrangement, an object with a high accuracy in accordance with the measurement data can be formed. It is difficult or impossible to correct the shape of the object when the shape of the object is measured after the object is formed. However, since the shape of the object under formation can be determined as described above, when a portion formed at the object-forming point has a measurement data out of the dimensional tolerance, the shape of the object at the object-forming point can be immediately corrected.

In the object-forming machine according to the above aspect of the invention, it is preferable that the shape-correction control unit is configured to control the object-forming unit to add the object material to the object-forming point in conformity with the measurement data when the measurement data is smaller than a minimum tolerable dimension of the dimensional tolerance.

In the above arrangement, an additional amount of the object material is supplied to a part at which the measurement data is smaller than the minimum tolerable dimension of the dimensional tolerance. With the above arrangement, the object in conformity with the design data can be formed.

In the object-forming machine according to the above aspect of the invention, it is preferable that the shape-correction control unit is configured to control the object-forming unit to remove a part the object material laminated on the object-forming point in conformity with the measurement data when the measurement data is larger than a maximum tolerable dimension of the dimensional tolerance.

According to the above arrangement, the part at which the measurement data is larger than the maximum tolerable dimension of the dimensional tolerance is removed by being cut or melted using, for instance, laser beam. With the above arrangement, the object in conformity with the design data can be formed.

In the object-forming machine according to the above aspect of the invention, it is preferable that the image-capturing unit is configured to capture the image in a predetermined area at and around the object-forming point.

According to the above arrangement, the image-capturing unit captures an image of a part of the object at and around the object-forming point at which the object is formed using the object-forming unit, and the shape measurement unit measures the cross section of the object based on the captured image at and around the object-forming point. In the above arrangement, the object material is laminated at the object-forming point based on a design data to form the object. Accordingly, by capturing the image of the area at and around the object-forming point using the image-capturing unit, whether or not the object material is appropriately laminated at the object-forming point can be determined, so that the cross section can be highly accurately measured. Further, since the image of the narrow area around the object-forming point is captured, the resolution of the captured image at and around the object-forming point can be enhanced, thereby improving the measurement accuracy of the shape of the object.

The object-forming machine according to the above aspect of the invention preferably includes an object-forming head configured to be moved by a drive mechanism, the object-forming head being provided with the object-forming unit, in which the image-capturing unit is provided to the object-forming head.

In the above arrangement, the object-forming unit and the image-capturing unit are provided to the object-forming head and the object-forming head is configured to be moved by the drive mechanism. According to the above arrangement, the object-forming point can be shifted in accordance with the movement of the object-forming head by the drive mechanism. Further, since the image-capturing unit is moved together with the object-forming head, the image at and around the object-forming point can be easily captured.

In the object-forming machine according to the above aspect of the invention, it is preferable that the image-capturing unit is fixed at a predetermined position, and configured to capture the image of an entirety of the object from the predetermined position.

In the above arrangement, the image-capturing unit is fixed at the predetermined position, and configured to capture the image of the entirety of the object from the predetermined position. According to the above arrangement, since the image of the entirety of the object is captured, the image processing can be facilitated as compared to an instance where the images captured at and around the object-forming point are combined to measure the cross section. Further, with the use of an image-capturing unit with a high resolution of the captured image, the reduction in the shape measurement accuracy can be restrained.

If an image-capturing unit is provided to the object-forming head, the size and weight of the object-forming head increase. However, since the image-capturing unit is provided independently of the object-forming head, the size-reduction of the object-forming head can be promoted.

A cross-section measurement apparatus according to another aspect of the invention includes: an image-capturing unit configured to capture an image of a three-dimensional object formed by an object-forming unit configured to laminate an object material at an object-forming point based on a design data to form the object; and a cross-section measurement unit configured to measure a cross section of the object based on the image captured by the image-capturing unit while the object is under formation by the object-forming unit.

According to the above aspect of the invention, without the need for the dedicated large-sized device such as an X-ray CT scanner and MRI, the object-forming machine capable of measuring the inner cross section of the object with a simple structure can be provided. Further, by attaching the cross-section measurement apparatus including the image-capturing unit and the cross-section measurement unit to an existing three-dimensional object-forming machine (e.g. a 3D printer), the cross section of the object formed using the existing three-dimensional object-forming machine can be accurately measured.

A cross-section measurement method according to still another aspect of the invention is for measuring a cross section of a three-dimensional object formed by an object-forming machine configured to laminate an object material at an object-forming point based on a design data to form the three-dimensional object, the method including: capturing an image of the object under formation while the object is under formation by the object-forming machine; and measuring a cross section of the object based on the captured image.

According to the above aspect of the invention, without requiring a large-sized dedicated machine, a cross section of an object can be easily measured in the same manner as in the above aspects of the invention.

According to the above aspects of the invention, a cross section of a three-dimensionally formed object can be easily measured with a simple structure.

DESCRIPTION OF EMBODIMENT(S)

First Exemplary Embodiment

A 3D printer according to a first exemplary embodiment of the invention will be described below with reference to the attached drawings.

Figure 1:
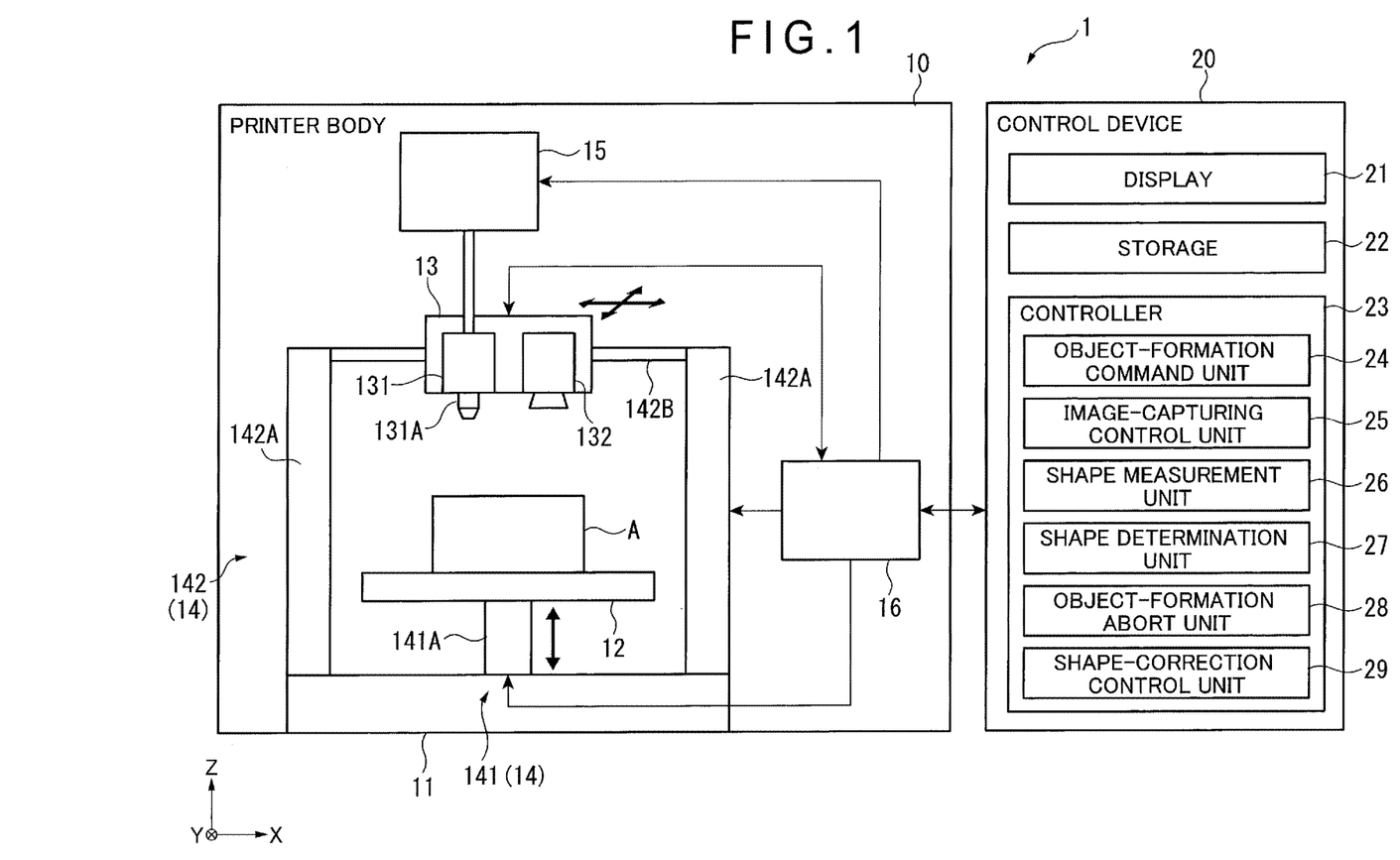
FIG. 1 illustrates an outline of a 3D printer according to a first exemplary embodiment of the invention.

FIG. 1 illustrates an outline of the 3D printer according to the first exemplary embodiment.

The 3D printer 1 defines an object-forming machine of the invention. As shown in FIG. 1, the 3D printer 1 includes a printer body 10 and a control device 20. The 3D printer 1 is an apparatus configured to form a three-dimensional object A (simply referred to as an object A hereinafter) in accordance with a design data. The 3D printer 1 is configured to measure an outer profile and/or inner cross section of the formed object A and display the measurement result on a display 21 provided to the control device 20, and to determine whether or not the dimensions of the object A are within a dimensional tolerance based on the measurement result of the formed object A.

Arrangement of Printer Body 10

As shown in FIG. 1, the printer body 10 includes a base 11, a table 12, an object-forming head 13, a drive mechanism 14, an object material supply unit 15, and a printer controller 16.

The base 11 supports the table 12 and the object-forming head 13. The table 12 and the object-forming head 13 are supported by the base 11 through the drive mechanism 14 configured to shift an object-forming point.

The drive mechanism 14 includes an elevation mechanism 141 configured to move the table 12 in a Z-axis direction (height direction), and a head drive mechanism 142 configured to move the object-forming head 13 in an X-axis direction and Y-axis direction orthogonal to the Z-axis direction.

The elevation mechanism 141 includes a support shaft 141A protrudable with respect to the base 11 in, for instance, the Z-axis direction, and an elevation drive unit (not shown) configured to extend/retract the support shaft 141A in the Z-axis direction. The table 12 is fixed to an end of the support shaft 141A. The table 12 is vertically movable by the extension/retraction of the support shaft 141A using the elevation drive unit. It should be noted that the specific arrangement of the elevation mechanism 141 is not limited to the above, but, for instance, a part of the table 12 may be engaged with a screw axially movable in the Z-axis direction to vertically move the table 12 in accordance with rotations of the screw, or the table 12 may be vertically moved using a hydraulic piston and the like.

The head drive mechanism 142 includes two columns 142A extending from the base 11 in the +Z-axis direction and slidable in the Y-axis direction, a beam 142B supported by the columns 142A and extending in the X-axis direction, a Y-axis drive unit (not shown) configured to slide the columns 142A in the Y-axis direction, and an X-axis drive unit (not shown) configured to slide the object-forming head 13 along the beam 142B (in the X-axis direction). It should be noted that it is not requisite that the head drive mechanism 142 is structured as described above, but, for instance, the object-forming head 13 may alternatively be held by a multijoint arm and the object-forming head 13 may be moved by controlling angles of the joint portions of the multijoint arm.

The table 12 is, for instance, a plate-shaped member provided on the elevation mechanism 141 in a manner capable of vertical movement along the Z-axis direction. The object A is formed on the upper surface of the table 12 using the object-forming head 13.

Figure 2:
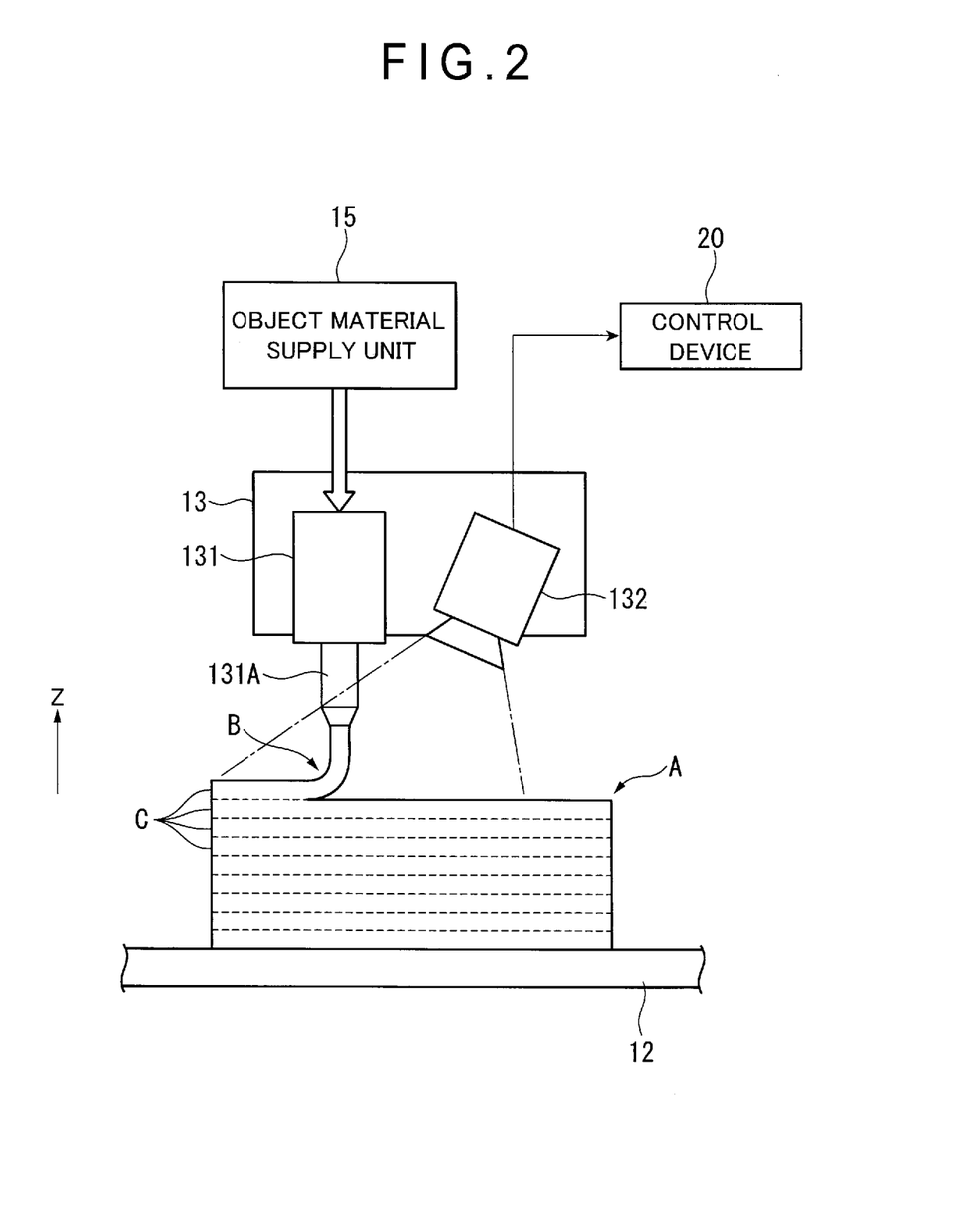
FIG. 2 illustrates an outline of an object-forming head according to the first exemplary embodiment.

FIG. 2 schematically illustrates an arrangement of the object-forming head 13.

As shown in FIGS. 1 and 2, the object-forming head 13 includes an object-forming unit 131 and an image capturing unit 132.

The object-forming unit 131 (an object-forming unit of the invention) extrudes an object material supplied by the object material supply unit 15 from a nozzle 131A at a predetermined object-forming point B (see FIG. 2) on the table 12 to form the object A.

In the first exemplary embodiment, the object-forming head 13 is moved to the object-forming point based on the design data in accordance with the command from the control device 20. Then, the object material is extruded from the nozzle 131A of the object-forming unit 131 at the object-forming point to form a layer of the object material. The above object material extrusion is sequentially repeated while shifting the object-forming points B to form a single layer of an object-formation layer C (see FIG. 2). Subsequently, the table 12 is descended by the thickness of the one layer and a single layer of the object-formation layer C is again formed. The above steps are repeated to form the object A from a plurality of object formation layers C. It should be noted that the nozzle 131A may have a variable nozzle diameter. In such an instance, it is possible to control the amount of the object material to be laminated by appropriately changing the nozzle diameter. In the first exemplary embodiment, the object material (e.g. molten resin and molten metal) supplied from the object material supply unit 15 is extruded and laminated at the object-forming point to form the object A. Accordingly, a cooling mechanism (e.g. a cooling fan) for solidifying the molten object material may be additionally provided.

It should be noted that, though the object-forming unit 131 is exemplarily configured to extrude the object material and laminate the object material at the object-forming point B, the object-forming unit of the invention is not limited to the above object-forming unit 131 but the object-forming unit may employ any formation method. For instance, a droplet of a molten material of ultraviolet curing resin may be discharged to the object-forming point B and may be irradiated with ultraviolet to be cured and laminated. Alternatively, a solid object material may be transferred to the object-forming point B and may be heated to be melted and laminated using a high-powered laser beam and a heated wire. Further alternatively, a granular material for one layer of the object may be paved on the table and the granular material at the object-forming point B may be sintered using a laser beam and the like or may be fixed by a discharged adhesive to form the object formation layer C. Subsequently, the granular material may be paved again and the same treatments may be applied to form the object A.

The image capturing unit 132 (image-capturing unit of the invention) captures an image of the object A having been formed or under formation (object formation layer C) on the table 12 and outputs the captured image to the control device 20.

In the exemplary embodiment, the image capturing unit 132 is mounted on the object-forming head 13 and constantly captures an image at and around the object-forming point B (a predetermined area at and around the object-forming point B). Accordingly, as shown in FIG. 2, the image capturing unit 132 is preferably inclined at a predetermined angle toward the object-forming unit 131 with respect to the Z-axis direction. With such an arrangement, since the high-resolution image of the predetermined area around the object-forming point B can be captured, the dimension of the object formation layer C can be highly accurately measured.

The object material supply unit 15 is connected with, for instance, the object-forming unit 131 of the object-forming head 13 using a connection unit (e.g. heat-resistant tube) to supply the object material to the object-forming unit 131. The object material supply unit 15 is configured to control the supply amount of the object material to be supplied to the object-forming unit 131 in accordance with a command from the control device 20. A predetermined amount of the object material can be laminated at the object-forming point B by controlling the supply amount of the object material. Accordingly, even when the object A with a minute structure is to be produced, a high-quality object A with a high dimensional accuracy can be formed.

The printer controller 16 is connected with the drive mechanism 14, the object-forming unit 131 and the image capturing unit 132 of the object-forming head 13, the object material supply unit 15 and the like. Further, the printer controller 16 is connected to the control device 20 in a manner capable of communication therewith, so that the printer controller 16 controls a drive of the respective components including the drive mechanism 14, the object-forming head 13 and the object material supply unit 15 in accordance with a control command from the control device 20 and transmits the captured image captured by the image capturing unit 132 to the control device 20.

Arrangement of Control Device 20

As shown in FIG. 1, the control device 20 includes the display 21, a storage 22, and a controller 23.

The display 21 is configured to display an image such as the image captured by the image capturing unit 132.

The storage 22 is configured to store control programs and various data for controlling the 3D printer 1, the design data for forming the object A and the like.

The controller 23 includes a computer unit such as a CPU (Central Processing Unit) and a storage circuit. The controller 23 is configured to read and run the various programs stored in the storage 22 to serve as an object-formation command unit 24, an image-capturing control unit 25, a shape measurement unit 26, a shape determination unit 27, an object-formation abort unit 28, a shape-correction control unit 29 and the like.

The object-formation command unit 24 outputs to the printer body 10 an object-formation command signal for controlling the drive mechanism 14 and the object-forming head 13 in accordance with the design data of the object A stored in the storage 22 and the like or the design data of the object A separately inputted from an external device or through the Internet. In response, the printer controller 16 of the printer body 10 drives the drive mechanism 14 to move the object-forming head 13 to the object-forming point B in accordance with the design data. Then, the printer controller 16 supplies the object material (e.g. molten resin) from the object material supply unit 15 to the object-forming unit 131 and laminates the object material at the object-forming point B using the object-forming unit 131.

When the object-formation command signal is outputted by the object-formation command unit 24, the image-capturing control unit 25 outputs an image-capturing command signal for capturing the image using the image capturing unit 132 in conjunction with the actuation (lamination of object material at the object-forming point) of the object-forming unit 131.

The shape measurement unit 26 measures the shape of the object A and/or the shape of the object formation layer C under formation based on the captured image.

Specifically, the shape measurement unit 26 applies, for instance, smoothing, a median filter, a bilateral filter and the like to the captured image to remove noises therein and calculates characteristic values (e.g. luminance difference of pixels) of the captured image to detect an edge of the object A and/or the object formation layer C. Further, since the arrangement of an imaging optical system of the image capturing unit 132 is known, the magnification of the captured image and the distance from the image capturing unit 132 to the object-forming point B are known. Accordingly, when the edge in the captured image is detected as described above, the dimension between the edges (corners) of the actual object A and/or the object formation layer C can be measured based on, for instance, the distance between the edges in the captured image. Specifically, the shape measurement unit 26 measures an outer dimension (measurement data) of the object A and/or the object formation layer C based on the number of pixels between edges detected by a predetermined processing on the captured image and the known parameters including a zoom magnification of the imaging optical system of the image capturing unit 132 and the distance from the image capturing unit 132 to the object-forming point B.

The shape determination unit 27 determines whether or not the measurement data (actually measured dimension) of the object A and/or the object formation layer C is within a predetermined dimensional tolerance defined by the design data. Specifically, the shape determination unit 27 calculates a difference between the design data and the measurement data and determines whether or not the difference is within the predetermined tolerance.

The object-formation abort unit 28 outputs to the printer body 10 an object-formation abort command signal for aborting the formation by the object-forming unit 131 when the shape determination unit 27 determines that the measurement data is out of the dimensional tolerance and is greater than the design data. In other words, if the formation process of the object is continued when a dimension of the object A (object formation layer C) under formation is greater than a reference dimension recorded in the design data, the object A with a low quality is produced, which is a waste of formation cost (i.e. object material and formation time), and thus the formation process is aborted.

The shape-correction control unit 29 supplies an additional object material to the object-forming point B to correct the shape of the object so that the measurement data comes within the dimensional tolerance when the shape determination unit 27 determines that the measurement data exceeds the dimensional tolerance and the measurement data is smaller than the design data. Specifically, the shape-correction control unit 29 calculates a difference between the measurement data and the design data and outputs to the printer body 10 a shape-correction command signal for supplying the object material corresponding to the difference onto the object-forming point B. In response, the object-forming unit 131 is moved to the position (object-forming point B) determined to have a small dimension and the object material corresponding to a correction value calculated for the object-forming point B is supplied to the object-forming point B to form the object A in conformity with the design data.

Formation Method of Object A Using 3D Printer 1

Next, a formation method of the object A using the above-described 3D printer 1 and a measurement method of a cross-section of the object A will be described below.

Figure 3:
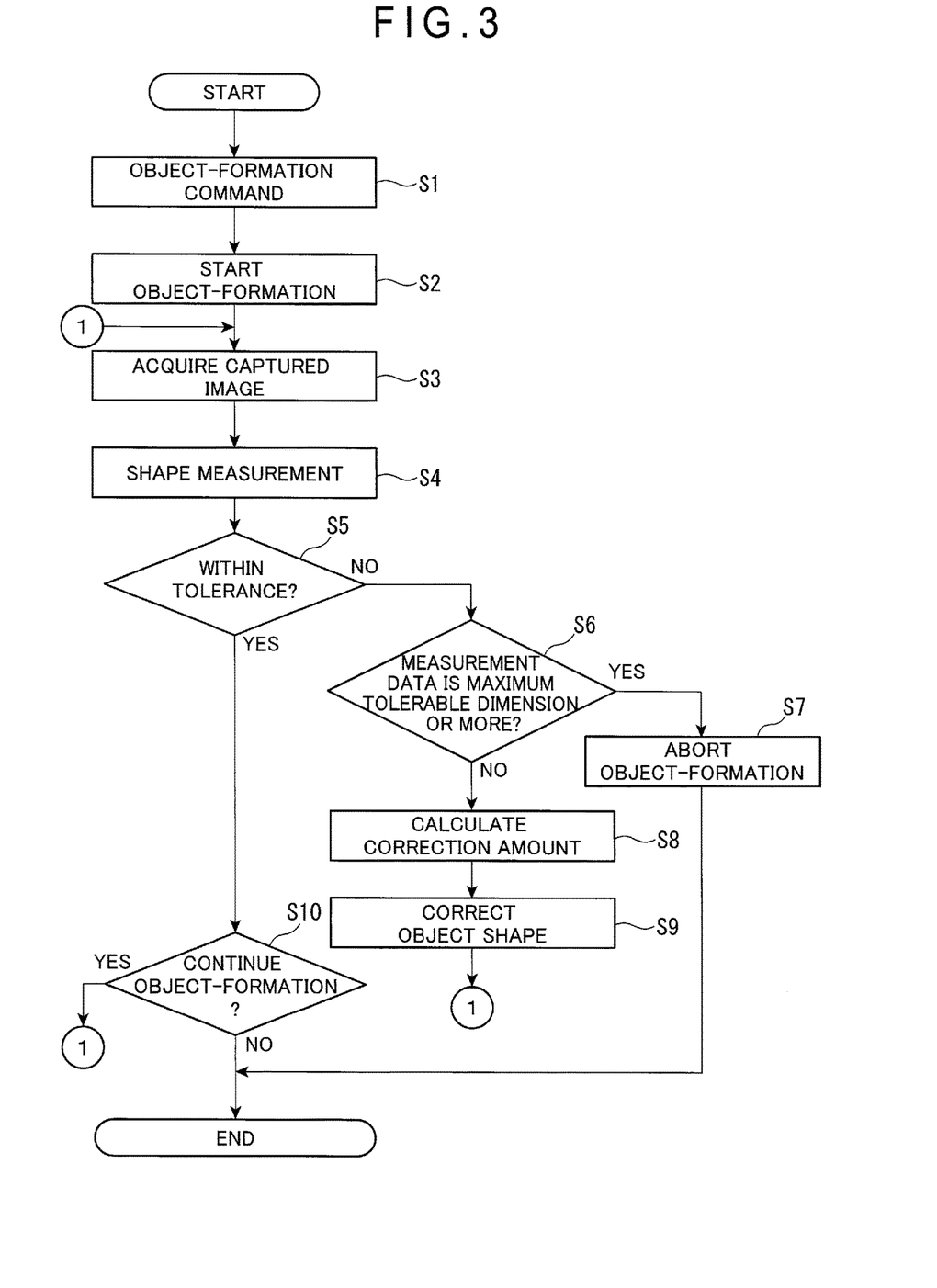
FIG. 3 is a flowchart showing an object-forming method of an object according to the first exemplary embodiment.

FIG. 3 is a flowchart showing the formation method of the object A according to the first exemplary embodiment.

When the object A is to be formed, the object-formation command unit 24 of the control device 20 acquires the design data corresponding to the object A to be formed in response to, for instance, an operation of an operator. The design data may be acquired from an external device though a communication medium such as the Internet, or the design data stored in the storage 22 of the control device 20 may be used.

The object-formation command unit 24 generates an object-formation command signal based on the acquired design data and outputs the object-formation command signal to the printer body 10 (Step 51). It should be noted that the object-formation command signal includes, for instance, parameters such as coordinates of the object-forming point B, the supply amount of the object material to be supplied at the object-forming point B and a movement path of the object-forming head 13, the parameters being defined for each of the object formation layers C defining the object A.

When the printer controller 16 of the printer body 10 receives the object-formation command signal in Step 51, the printer controller 16 starts the object-formation operation (Step S2). Specifically, the printer controller 16 controls the drive mechanism 14 to vertically move the table 12 to move the object-forming head 13 to a position corresponding to the predetermined object-forming point B. Then, the printer controller 16 controls the object material supply unit 15 to supply the object material of the supply amount corresponding to the object-formation command signal to the object-forming unit 131, and the object material is supplied from the object-forming unit 131 onto the object-forming point B. The above steps are repeated to form the single object formation layer C as described above and a plurality of the object formation layers C are layered to form the object A.

Further, when the object-formation operation is started in Step S2, the image-capturing control unit 25 controls the image capturing unit 132 to capture the image at the portion at and around the object-forming point B and acquire the captured image (Step S3). In other words, the captured image of the object-forming point B is constantly acquired while the object A is under formation.

Then, when the captured image of the object-forming point B is acquired in Step S3, the shape measurement unit 26 measures the shape of the object under formation (i.e. the object formation layer C) based on the captured image (Step S4). In other words, the shape measurement unit 26 calculates the dimensions (measurement data) of relevant portions of the object formation layer C within the area of the captured image. It should be noted that the object material immediately after being laminated on the object-forming point B is sometimes being hardened and shrunk depending on the conditions, the type of the object material or the like.

Accordingly, the measurement data of the object formation layer C upstream of the object-forming point B in a movement direction along the movement path of the object-forming head may be measured. Further, the captured image may be displayed on the display 21 at this time.

The shape determination unit 27 determines whether or not the measurement data is within the dimensional tolerance defined for each of the design data (Step S5).

When the determination result in the Step S5 is No (i.e. when it is determined that the measurement data is out of the range of the dimensional tolerance), the shape determination unit 27 further determines whether or not the measurement data is at or more than a maximum tolerable dimension (Step S6). In other words, the shape determination unit 27 determines whether or not the dimension of the object formation layer C is greater than the dimension defined by the design data.

When the determination result is Yes, the object-formation abort unit 28 outputs the object-formation abort command signal to the printer body 10 to abort the object-formation operation of the object-forming unit 131 (Step S7).

On the other hand, when the determination result in Step S6 is No (i.e. when the measurement data is not at or more than the maximum tolerable dimension), it is concluded that the measurement data is less than a minimum tolerable dimension (i.e. the dimension of the object formation layer C is smaller than the dimension defined by the design data).

At this time, the shape-correction control unit 29 calculates a difference between the measurement data and the design data and calculates a supply amount (supply amount corresponding to the difference) of the object material for compensating the shortage in the dimension at the object-forming point B as the correction value (Step S8).

Then, the shape-correction control unit 29 outputs the shape-correction command signal including the calculated correction value to the printer body 10. Thus, the printer controller 16 performs the object-shape correction (Step S9). Specifically, the printer controller 16 moves the object-forming head 13 to the object-forming point B at which the measurement data is at or less than the minimum tolerable dimension, and supplies the amount of the object material corresponding to the correction value from the object material supply unit 15 to the object-forming unit 131. Then, the printer controller 16 controls the object-forming unit 131 to supply the amount of the object material corresponding to the correction value onto the object-forming point B to correct (compensate) the shape of the object formation layer C at the object-forming point B so that the dimension is in conformity with the predetermined design data.

Subsequently, the normal object-formation operation is resumed to continue the process at and subsequent to the Step S3.

When the determination result in the Step S5 is Yes (i.e. when it is determined that the measurement data is within the range of the dimensional tolerance), the control device 20 determines whether or not the object-formation operation is to be continued (Step S10). When the formation of the object A is completed, the determination result of the control device in Step S10 is No and a series of the object-formation operations is ended. When the determination result in Step S10 is Yes (i.e. when the formation of the object A is not completed), the object-formation operation is continued and the procedure returns to Step S3.

Advantage(s) of First Exemplary Embodiment

The 3D printer 1 of the first exemplary embodiment includes the printer body 10 including the object-forming unit 131 configured to laminate the object material to form the object A and the image capturing unit 132 configured to capture the image of the area at and around the object-forming point B, and the control device 20 configured to control the printer body 10. The shape measurement unit 26 of the control device 20 measures the outer dimension of the object A based on the image (captured image of the object formation layer C) captured by the image capturing unit 132 while the object-formation operation by the object-forming unit 131 is in progress.

Accordingly, as compared with an instance in which the inner cross section of the object A is measured using a dedicated and large-sized device such as an X-ray CT scanner and Mill after the formation of the object A by the object-forming unit 131 is completed, the cross section of the object A can be easily measured using a small image-capturing camera such as a CCD, thereby achieving simplification and size reduction of the 3D printer 1. Further, since no radioactive ray (e.g. X ray) that is harmful to the human body is used, the external shape and internal structure of the object A can be safely measured.

In the 3D printer 1 according to the first exemplary embodiment, the shape determination unit 27 determines whether or not the measurement results (measurement data) of the object A and/or the object formation layer C measured by the shape measurement unit 26 is within the dimensional tolerance defined by the design data.

With such an arrangement, the 3D printer 1 of the first exemplary embodiment is not only capable of measuring the inner and outer shapes of the object A but also capable of determining whether or not the object A is accurately formed into a shape in accordance with the design data.

Further, since the shape of the object A is measured based on the captured image during the formation of the object A, the object-formation operation can be immediately aborted when an abnormality is found based on the measurement data measured during the object formation.

In the 3D printer 1 of the first exemplary embodiment, the object-formation abort unit 28 aborts the object-formation by the object-forming unit 131 when it is determined that the measurement data is out of the dimensional tolerance and the measurement data is greater than the design data.

Accordingly, waste of the object material due to the production of low-quality object A involving an object-formation error can be restrained. Further, since the low-quality object A is not completely formed, a yield rate is improvable.

The shape-correction control unit 29 of the 3D printer 1 of the first exemplary embodiment calculates the correction value based on the difference between the measurement data and the design data and supplies the object material to the object-forming point at which the dimension is found to be smaller than that defined by the design data (object-shape correction) when it is determined that the measurement data exceeds the dimensional tolerance and the measurement data is smaller than the dimension defined by the design data (when the measurement data is smaller than the minimum tolerable dimension of the dimensional tolerance).

With such an arrangement, the deterioration of the quality of the object A can be restrained and the object A with a high quality in conformity with the design data is producible.

In the first exemplary embodiment, the image capturing unit 132 is provided to the object-forming head 13 on which the object-forming unit 131 is provided, and is configured to capture the image of the object A at and around the object-forming point B formed by the object-forming unit 131.

In the first exemplary embodiment, the object material is laminated at the object-forming point B based on the design data to form the object A. Accordingly, by acquiring the captured image of the object A at and around the object-forming point B using the image capturing unit 132, whether or not the object material is appropriately laminated on the object-forming point B can be determined, thereby highly accurately measuring the object formation layer C. Further, since a high-resolution image within a predetermined image-capturing area including the object-forming point B can be acquired, the measurement accuracy of the shape of the object can be enhanced as compared with an instance where, for example, the entirety of the image of the formed object A or the object formation layer C is captured from a position remote from the object-forming point B.

It is possible to capture an image of the object A at and around the object-forming point B using, for instance, a zoom function of a camera located at a position remote from the object-forming head 13. However, an image-capturing position of such a camera has to follow the movement of the object-forming point B, so that a complicated control for the image capturing unit 132 becomes necessary. Alternatively, a measurement head provided with the image capturing unit 132 may be separately provided and the measurement head may be moved following the movement of the object-forming head 13. However, such an arrangement requires the additional measurement head and a drive mechanism thereof, so that the structure becomes complicated. In contrast, when the image capturing unit 132 is provided on the object-forming head 13 as described above, the structure and the control process can be simplified.

Second Exemplary Embodiment

Next, a 3D printer according to a second exemplary embodiment of the invention will be described below with reference to the attached drawings.

In the 3D printer 1 of the first exemplary embodiment, the object-formation abort unit 28 aborts the object-formation when it is determined that the measurement data is out of the dimensional tolerance and the measurement data is greater than the design data. In contrast, the second exemplary embodiment differs from the first exemplary embodiment in that the object-formation is not aborted even under such a circumstance but the shape of the object is corrected.

Figure 4:
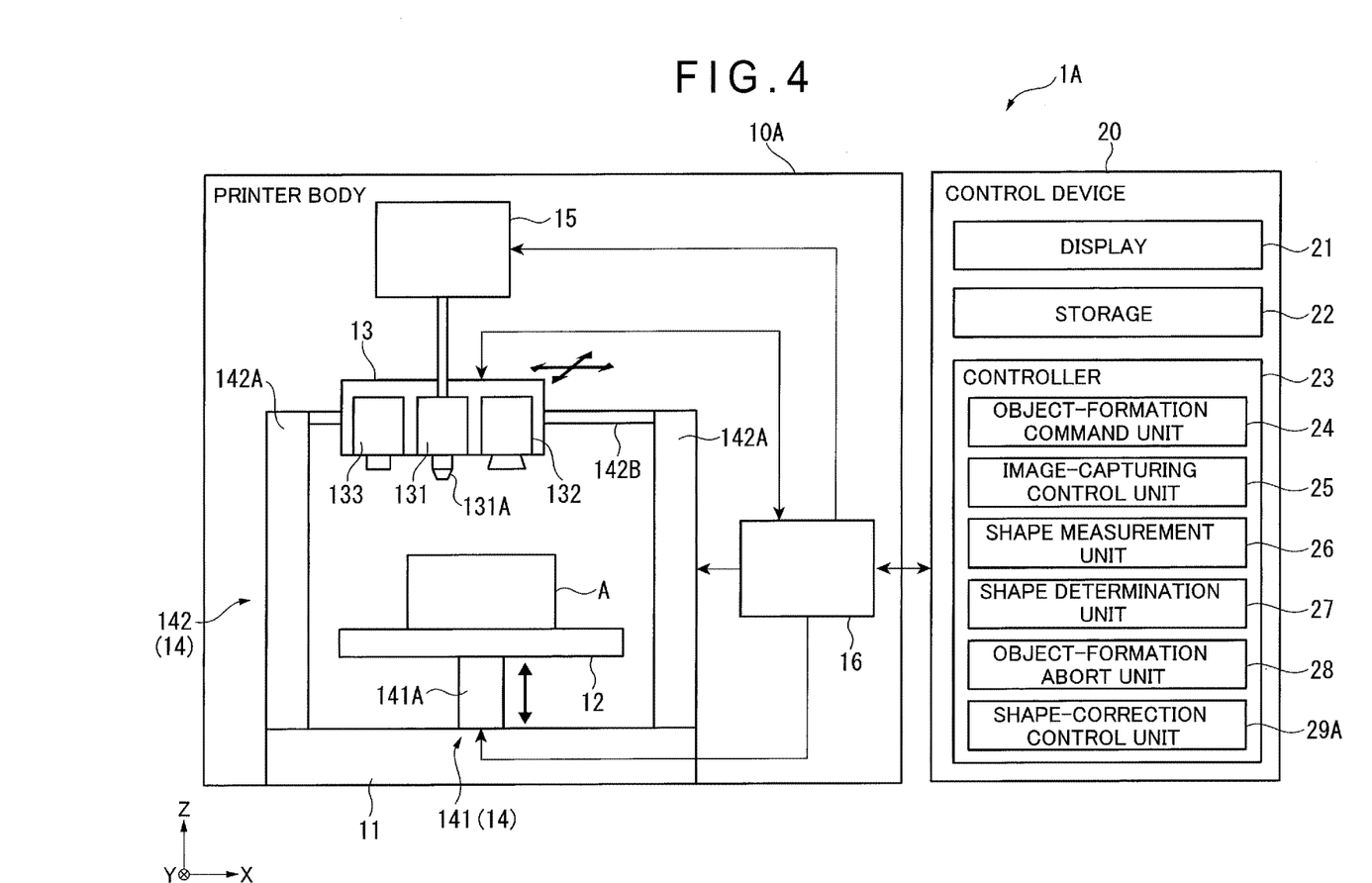
FIG. 4 illustrates an outline of a 3D printer according to a second exemplary embodiment of the invention.

FIG. 4 illustrates an outline of the 3D printer according to the second exemplary embodiment. It should be noted that the same components as those in the first exemplary embodiment will be denoted by the same reference numerals in the description below to omit or simplify the explanation thereof.

A 3D printer 1A of the second exemplary embodiment includes a printer body 10A provided with the object-forming head 13, on which a material removal unit 133 configured to remove a part of the formed structural body is mounted in addition to the object-forming unit 131 and the image capturing unit 132.

The material removal unit 133 includes, for instance, a laser beam source configured to emit a high-powered laser beam. The material removal unit 133 emits the laser beam onto a part of the object formation layer C to burn off, melt or gasify to remove the part irradiated with the laser beam.

It should be noted that, though the material removal unit 133 removes a part of the object formation layer C using the laser beam in the second exemplary embodiment, it is not necessary for the material removal unit 133 to be always structured as described above. For instance, a part of the object formation layer C may be cut using a blade of metal, ceramics and the like, or the part of the object A may be removed using any methods.

Further, though the material removal unit 133 is exemplarily provided to the object-forming head 13, an additional head for removing the object may be provided and the material removal unit 133 may be provided on the additionally provided head.

When the shape determination unit 27 determines in the same manner as in the first exemplary embodiment that the measurement data exceeds the dimensional tolerance and the measurement data is smaller than the design data, a shape-correction control unit 29A supplies an additional object material to the object-forming point B to correct the shape of the object so that the measurement data comes within the dimensional tolerance.

In addition, when the shape determination unit 27 determines that the measurement data exceeds the dimensional tolerance and is greater than the dimension defined by the design data, the shape-correction control unit 29A controls the material removal unit 133 to remove the part of the object A at the object-forming point B whose dimension is determined to be greater than the dimension defined by the design data (object-shape correction).

The object-formation method of the object A using the 3D printer 1A according to the second exemplary embodiment is substantially the same as that in the first exemplary embodiment but is only different in the process in Step S7.

Specifically, the 3D printer 1A of the second exemplary embodiment performs the object-shape correction for removing the part of the object formation layer C instead of Step S7 in the object-forming process in the first exemplary embodiment shown in FIG. 3.

More specifically, the shape-correction control unit 29A calculates a difference between the measurement data and the design data. Then, the shape-correction control unit 29A outputs to the printer body 10 a shape-correction command signal for removing a part of the object formation layer C laminated at the object-forming point B by an amount corresponding to the calculated difference. In response, the material removal unit 133 is moved to the position (object-forming point B) determined to have a larger dimension and a part of the object formation layer C corresponding to a correction value (removal amount) calculated for the object-forming point B is removed.

It should be noted that, if the difference between the measurement data and the design data is at or more than a predetermined first threshold, the measurement may be aborted by the object-formation abort unit 28 when the measurement data exceeds the dimensional tolerance and the measurement data is greater than the design data, and the object-shape correction (removal) may be performed by the shape-correction control unit 29A when the difference is less than the first threshold.

According to the above-described 3D printer 1A in the second exemplary embodiment, when the measurement data measured by the shape measurement unit 26 exceeds the dimensional tolerance and is greater than the design data (i.e. when the measurement data is greater than the maximum tolerable dimension of the dimensional tolerance), since the part of the object formation layer C is removable, the object A of a dimension in conformity with the design data can be formed.

Third Exemplary Embodiment

Next, a 3D printer according to a third exemplary embodiment of the invention will be described below with reference to the attached drawings.

In the above-described first exemplary embodiment, the image capturing unit 132 is provided to the object-forming head 13 and the image of the object A at and around the object-forming point B is exemplarily captured. In contrast, the third exemplary embodiment differs from the first and second exemplary embodiments in that the image capturing unit is provided at a position remote from the object-forming head 13.

Figure 5:
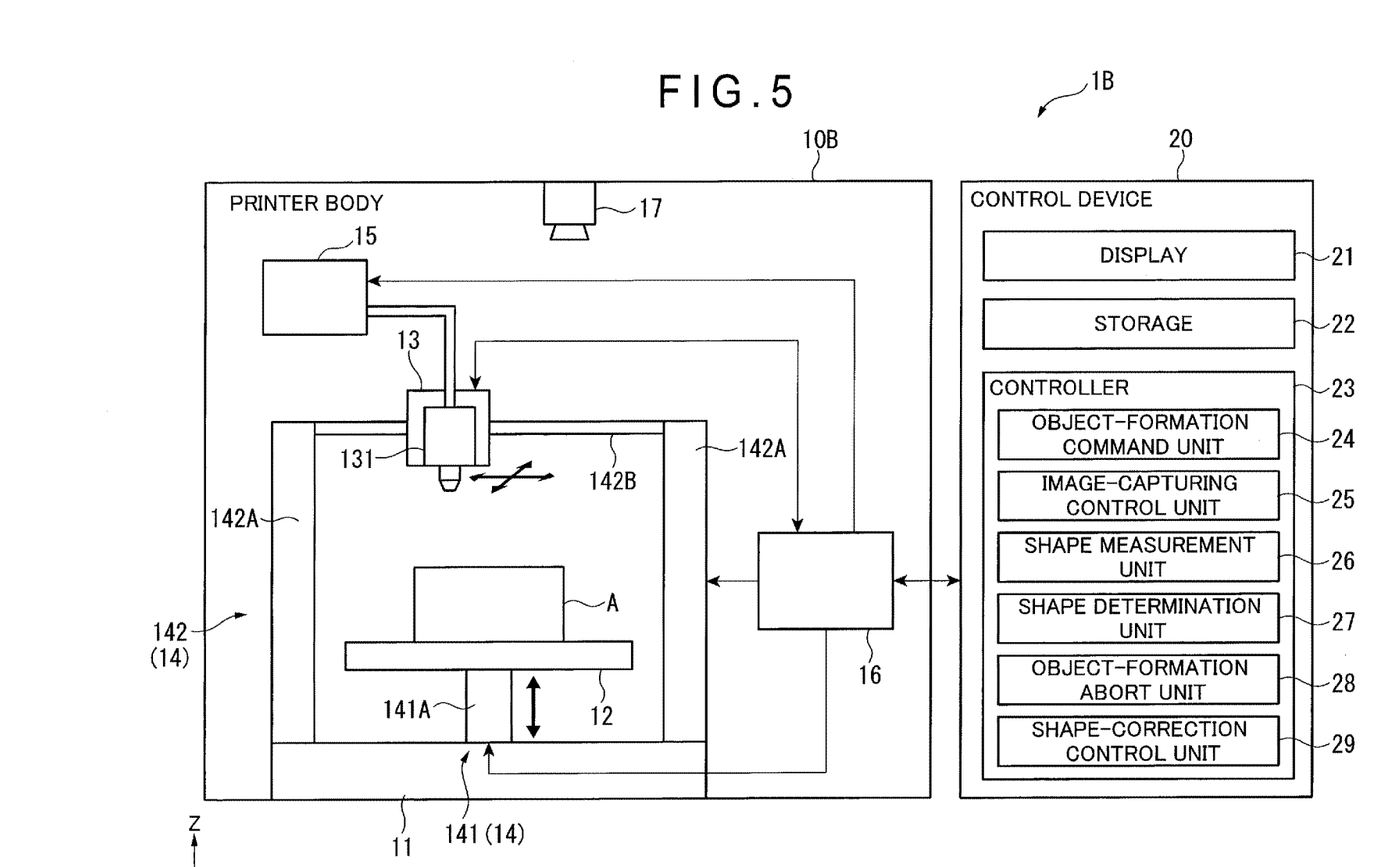
FIG. 5 illustrates an outline of a 3D printer according to a third exemplary embodiment of the invention.

FIG. 5 illustrates an outline of a 3D printer according to the third exemplary embodiment.

A 3D printer 1B of the third exemplary embodiment does not include the object-forming unit 132 on the object-forming head 13 of a printer body 10B but an image capturing unit 17 is fixed at a position remote from the object-forming head 13 (e.g. a frame or a chamber of the printer body 100B). The image capturing unit 17 is fixed at a fixed position and is set at a field angle capable of capturing an image of the entirety of the table 12 from the fixed position. In other words, the image capturing unit 17 in the third exemplary embodiment is configured to capture the image of the entirety of the object A formed by lamination on the table 12.

Further, since the image capturing unit 17 is fixed at the fixed position in the third exemplary embodiment, the distance between the image capturing unit 17 and the object A changes in accordance with the vertical movement of the table 12. Accordingly, it is preferable for the image capturing unit 17 to be provided with an auto-focus function for automatically adjusting an image contrast in accordance with the captured image.

The auto focus function is achieved by, for instance, bringing the image capturing unit 17 into focus on the uppermost object formation layer C (the most newly formed object formation layer C) of the object A. At this time, the distance between the image capturing unit 17 and the object A may be detected using infrared ray, laser beam and the like to adjust the focus position or, alternatively, the focus position may be adjusted based on the image contrast of the captured image. In order to bring the image capturing unit 17 into focus on the focus position, a lens system of the image capturing unit 17 may be moved using a motor and the like to effect the focus adjustment, or, alternatively, the distance between the image capturing unit 17 and the object A may be minutely adjusted by vertically moving the table 12. When the focus adjustment is performed through the vertical movement of the table 12, the structure of the image capturing unit 17 can be further simplified.

It should be noted that, though the object-formation method of the object A using the 3D printer 1B is substantially the same as that in the first exemplary embodiment but it is preferable that the following process is performed in Step S3.

Specifically, in the third exemplary embodiment, the object-forming head 13 is moved outside the image-capturing area of the image-capturing unit 17 when the image is captured in Step S3 each time a predetermined number of object formation layer(s) C is laminated (e.g. per one layer). Then, the image-capturing control unit 25 controls the image capturing unit 17 to focus on, for instance, the uppermost object formation layer C of the object A using the auto focus function to acquire the captured image of the entirety of the object A. In other words, the image of the entirety of the object A including the newly formed object formation layer C is captured.

Though only the object-forming unit 131 is exemplarily provided to the object-forming head 13 in FIG. 5, the material removal unit 133 may be additionally provided to the object-forming head 13 as in the second exemplary embodiment.

In the third exemplary embodiment, the image capturing unit 17 is fixed at a fixed position on a frame and the like of the printer body 10B remote from the object-forming head 13.

In this arrangement, since the image capturing unit is not provided on the object-forming head 13, the weight of the object-forming head 13 can be reduced.

Further, since the image is captured by the image capturing unit 17 fixed at the fixed position, the image capturing unit 17 is less likely to be affected by the vibrations occurring in accordance with the movement of the object-forming head 13, so that the image is kept from being blurred by the vibrations. Accordingly, for instance, the accuracy for edge detection can be enhanced during the shape measurement process using the shape measurement unit 26, so that the measurement accuracy can be improved. It should be noted that, though the resolution of the image is deteriorated since the image capturing area in the above arrangement is wider than that in the arrangement in which the image capturing unit 132 is mounted on the object-forming head 13, the deterioration in the accuracy can be restrained by enhancing the resolution of the image pickup device used in the image capturing unit 17.

Further, though the images of the object A captured at the object-forming point B captured following the movement of the object-forming head 13 and/or the object A are combined to form the images of the entirety of the object formation layer C and the object A in the first exemplary embodiment, such an arrangement requires a complicated image processing for combining the images. In contrast, since the image capturing area is defined by the entirety of the table 12 in the third exemplary embodiment, the image processing for, for instance, combining the captured images is not necessary, so that the processing load can be reduced.

Further, since the image capturing unit 17 has the auto focus function, even when the table 12 is vertically moved or the height of the object A is enlarged, deterioration of the captured images and the like due to failure in bringing the image capturing unit 17 into focus can be restrained, thereby achieving the accurate shape measurement.

Modification(s)

Incidentally, it should be understood that the scope of the present invention is not limited to the above-described exemplary embodiments but includes modifications and improvements as long as the modifications and improvements are compatible with the invention.

Though only a single one of the image capturing unit 17 is exemplarily provided in the third exemplary embodiment, such an arrangement is not requisite. For instance, a plurality of the image capturing units 17 may be provided on a frame or in a chamber respectively at different positions and the images of the object A and the object formation layer C may be captured in a plurality of directions. According to such an arrangement, even when a part of the object formation layer C is shadowed by an edge of the object formation layer C or the like, since the images of the object formation layer C are captured from the plurality of directions using the plurality of image capturing units 17, the image of the shadowed part can be captured.

The same applies to the first and second exemplary embodiments, where, for instance, a plurality of the image capturing units 132 may be provided to the object-forming head 13.

Further, the image capturing unit 132 may be provided to the object-forming head 13 and the image capturing unit 17 may be fixed at the fixed position on the frame of the printer body 10 and the like.

The image-capturing unit may be provided on, instead of the predetermined fixed position on the object-forming head 13 and the printer body 10, an additional measurement head that is drivable independently of the object-forming head.

In such an arrangement, for instance, after the object-forming head 13 conducts the object-formation process at a first object-forming point and the object-forming head 13 is moved to a second object-forming point, the measurement head is moved of the first object-forming point to capture the image at the first object-forming point. Specifically, the object material is sometimes not completely solidified after the molten object material is laminated at the object-forming point B using the object-forming head 13. In this case, the dimensions at the object-forming point B differ due to contraction and the like in accordance with the solidification of the object material between the time when the object material is supplied (laminated) and the time when the object material is solidified and the object formation layer C is formed. In contrast, when the shape of the object formation layer C is measured after the object-formation process of the object-forming head 13 using the separate measurement head mounted with the image-capturing unit, the dimension after the formation of the object formation layer C can be measured, so that the form can be highly accurately measured.

Though the object-forming unit 131 in the above exemplary embodiments is exemplarily configured to extrude and laminate the object material in a shape of molten resin and the like from the nozzle 131A at the object-forming point B to form the object A, such an arrangement is not exhaustive. As described above, the object-forming unit 131 may be configured to, for instance, discharge droplets of a molten material such as an ultraviolet curing resin on the object-forming point B using an ink-jet device and the like and emit ultraviolet to the object-forming point B. Alternatively, a solid object material transferred to the object-forming point B may be heated to be melted for lamination.

Further, a granular object material of one layer may be paved on the table and the granular material at the object-forming point B may be sintered using a laser beam and the like or may be fixed by a discharged adhesive to form the object formation layer C. Subsequently, the granular material may be paved again and the same treatments may be applied to form the object A.

In this arrangement, though the granular material is paved, the profile of the area in which the granular material is solidified using the object-forming unit 131 can be detected based on a luminance difference in the captured image, so that the shape of the object formation layer C can be measured.

However, while the granular object material is left paved, it may sometimes be difficult to determine the profile of the area (i.e. a profile of the object formation layer C) in which the granular material is solidified by the object-forming unit 131. In this case, it is sufficient to remove the granular material in an area other than the object formation layer C (i.e. non-solidified granular material) before the image-capturing by the image capturing unit 132 (17).

When the image capturing unit 17 capable of capturing the image of the entirety of the table 12 (object A) is used as in the third exemplary embodiment, the granular material for a predetermined number of layer(s) (e.g. one layer) is removed after the predetermined number of layer(s) is formed before capturing the image by the image capturing unit 17. Subsequently, the granular material is paved again and the object-formation process is continued.

When the image capturing unit 132 is provided on the object-forming head 13, the granular material for a predetermined number of layer(s) (e.g. one layer) is removed after the predetermined number of layer(s) is formed, and the image of the object formation layer C is captured while the object-forming head 13 is moved in accordance with the design data of the object formation layer C of which image is to be captured.

It should be noted that the removed granular material can be collected and re-used each time the granular material is removed.

Examples of the granular material removal unit configured to remove the granular material include a fan or a blower for blowing off the granular material using a predetermined volume of air, and a brush or a spatula for sweeping the granular material. The granular material removal unit may be provided to the object-forming head 13. In such an arrangement, a part of the granular material along the movement path of the object-forming head 13 can be removed. Alternatively, a brush, a spatula or the like of the same width as the width of the table 12 may be moved in a direction orthogonal to a width direction of the table 12 to collectively remove the granular material of an amount for the predetermined number of layers on the table 12.

Though the image capturing unit 132 in the above-described first exemplary embodiment exemplarily captures the image of the object to measure the shape of the object each time the object material is laminated at the object-forming point B, such an arrangement is not exhaustive. For instance, the image may be captured each time the object formation layer C is formed at a predetermined area corresponding to the field angle (image-capturing area) of the image capturing unit 132. Alternatively, the image may be captured by the image capturing unit 132 each time a single one of the object formation layers C is formed as in the third exemplary embodiment. In this arrangement, after the (first) object formation layer C is formed and before the next (second) object formation layer C is formed, the object-forming head 13 is moved again along the movement path of the object-forming head 13 for the first object formation layer C to capture the image of the first object formation layer C using the image capturing unit 132.

Further alternatively, the image may be captured by the image capturing unit 132 or the image capturing unit 17 each time two or more of the object formation layers C are formed. The same applies in the third exemplary embodiment.

Though the object-shape correction is exemplarily performed in the first exemplary embodiment when the dimension indicated by the measurement data falls below the minimum tolerable dimension of the dimensional tolerance, the object formation process per se may be aborted in the same manner as when the dimension data exceeds the maximum tolerable dimension of the dimensional tolerance.

Though it is determined whether or not the amount of the laminated object material is appropriate (whether or not the measurement data is within the tolerance) when the object material is laminated at the object-forming point in the above-described exemplary embodiments, the shape of the object formation layer C that is an underlayer of the part at which the object material is laminated may be measured.

Though the table 12 is exemplarily vertically moved along the Z-axis direction and the object-forming head 13 is slid along X-axis and Y-axis directions in the above-described exemplary embodiments, any structure may be employed as long as the object-forming point of the object-forming unit 131 of the object-forming head 13 is shiftable to desired coordinate positions. For instance, the table may alternatively be configured to be moved in the X-axis and Y-axis directions and the object-forming head 13 may be configured to be vertically moved. Alternatively, the table 12 may be fixed and the object-forming head 13 may be configured to be moved in triaxial directions, or, alternatively, the object-forming head 13 may be fixed and the table 12 may be configured to be moved in the triaxial directions.

When the image capturing unit 132 is provided to the object-forming head 13, with the fixed object-forming head 13 and the triaxially movable table 12, the deterioration in the captured image in accordance with the movement of the object-forming head 13 can be avoided and the load for the image processing can be reduced.

The object-forming machine in a form of the 3D printers 1, 1A, 1B in the above-described exemplary embodiments exemplarily includes the object-forming unit (object-forming unit 131) and the image-capturing unit (image capturing unit 132 or the image capturing unit 17), and the control device 20 configured to control the printer body 10 exemplarily measures the cross section and/or outer profile of the object A based on the captured image.

Alternatively, the image-capturing unit may be detachably provided to the object-forming machine. Specifically, a cross-section measurement apparatus including the image-capturing unit and a controller (including the cross-section measurement unit of the invention) configured to control the image-capturing unit may be detachably provided to an existing 3D printer including a printer body having an object-forming unit and a control device configured to control the printer body.

In this arrangement, the image-capturing unit may be fixed at a predetermined position on, for instance, the frame of the printer body of the existing 3D printer, so that the printer body 10B having the same structure as that in the above-described third exemplary embodiment can be constructed. An independent terminal device and the like for controlling the image-capturing unit may be employed or, alternatively, a program for providing the functions of the shape measurement unit 26, the shape determination unit 27, the object-formation abort unit 28 and the shape-correction control unit 29 may be installed in a control device (e.g. a personal computer) configured to control the printer body of the existing 3D printer to achieve the functions by the controller (CPU) of the control device. According to such an arrangement, the control device can serve as the control device 20 in the above-described exemplary embodiments.

Other specific structures in implementing the invention can be altered as desired as long as such an alteration is compatible with an object of the invention.

What is claimed is:

1. An object-forming machine comprising:
a table;
an object-forming head;
a driver that includes a beam that holds the object-forming head, the driver being configured to move the object-forming head, relative to the table, along the beam;
an object-former provided on the object-forming head and configured to laminate an object material on the table to form an object;
an imager provided on the object-forming head and configured to capture an image of the object, wherein the object-former and the imager are indirectly supported by the beam via the object-forming head; and a processor configured to
- control the driver and the object-former based on design data to form the object on the table,
- control the imager to capture the image of the object while the object is under formation by the object-former, and
- measure a cross section of the object based on the image captured by the imager.

2. The object-forming machine according to claim 1, wherein
the processor is configured to determine whether or not measurement data of the measured object is within a dimensional tolerance defined based on the design data.

3. The object-forming machine according to claim 2, wherein
the processor is configured to abort an object-forming process by the object-former when determining that the measurement data is outside the dimensional tolerance.

4. The object-forming machine according to claim 2, wherein
the processor is configured to control the object-former to correct a shape of the object at an object-forming point when determining that the measurement data is outside the dimensional tolerance.

5. The object-forming machine according to claim 4, wherein
the processor is configured to control the object-former to add the object material to the object-forming point in conformity with the measurement data when the measurement data is smaller than a minimum tolerable dimension of the dimensional tolerance.

6. The object-forming machine according to claim 4, further comprising
a material remover configured to remove a part of the object material, wherein
the processor is configured to control the material remover to remove the part of the object material laminated on the object-forming point in conformity with the measurement data when the measurement data is larger than a maximum tolerable dimension of the dimensional tolerance.

7. The object-forming machine according to claim 4, wherein
the imager is configured to capture the image in a predetermined area at and around the object-forming point.

* * * * *